United States Patent
Ramachandran et al.

(10) Patent No.: US 10,263,882 B2
(45) Date of Patent: Apr. 16, 2019

(54) DYNAMICALLY INFLUENCING ROUTE RE-DISTRIBUTION BETWEEN AN EXTERIOR GATEWAY PROTOCOL AND AN INTERIOR GATEWAY PROTOCOL

(71) Applicant: Riverbed Technology, Inc., San Francisco, CA (US)

(72) Inventors: Subramanian Ramachandran, Sunnyvale, CA (US); Anoop A. Gupta, San Francisco, CA (US)

(73) Assignee: Riverbed Technology, Inc., San Francisco, CA (US)

( * ) Notice: Subject to any disclaimer, the term of this patent is extended or adjusted under 35 U.S.C. 154(b) by 0 days.

(21) Appl. No.: 15/799,383

(22) Filed: Oct. 31, 2017

(65) Prior Publication Data

US 2018/0123946 A1    May 3, 2018

Related U.S. Application Data

(60) Provisional application No. 62/415,344, filed on Oct. 31, 2016.

(51) Int. Cl.
| | |
|---|---|
| *H04L 12/26* | (2006.01) |
| *H04L 12/733* | (2013.01) |
| *H04L 12/781* | (2013.01) |
| *H04L 12/803* | (2013.01) |
| *H04L 12/751* | (2013.01) |
| *H04L 12/741* | (2013.01) |
| *H04L 29/08* | (2006.01) |
| *H04L 12/707* | (2013.01) |

(52) U.S. Cl.
CPC ........... *H04L 45/122* (2013.01); *H04L 45/02* (2013.01); *H04L 45/22* (2013.01); *H04L 45/52* (2013.01); *H04L 45/745* (2013.01); *H04L 47/125* (2013.01); *H04L 67/1042* (2013.01)

(58) Field of Classification Search
None
See application file for complete search history.

(56) References Cited

U.S. PATENT DOCUMENTS

| | | | |
|---|---|---|---|
| 2002/0199016 A1* | 12/2002 | Freedman | H04L 12/5692 709/241 |
| 2006/0098577 A1* | 5/2006 | MeLampy | H04L 29/06027 370/238 |
| 2007/0091793 A1* | 4/2007 | Filsfils | H04L 12/4633 370/228 |
| 2007/0091795 A1* | 4/2007 | Bonaventure | H04L 45/04 370/228 |

(Continued)

*Primary Examiner* — Anh Vu H Ly
(74) *Attorney, Agent, or Firm* — Park, Vaughan, Fleming & Dowler LLP; Laxman Sahasrabuddhe

(57) ABSTRACT

Systems and techniques are described for dynamically influencing route re-distribution between an exterior gateway protocol (EGP) and an interior gateway protocol (IGP). Some embodiments can dynamically influence which routes are re-distributed into the IGP network for use in cases where traffic destined to that particular remote site is desired to be steered on the desired network/border router. Moreover, some embodiments can dynamically influence route re-distribution from the IGP network to the EGP network for particular destinations so that traffic entering the local site is attracted over a particular network/border router.

17 Claims, 4 Drawing Sheets

Process 202

204 — In a local AS, establish an iBGP peering session with each BGP router in a set of BGP routers in the local AS, wherein the iBGP peering session is established by a first controller that is distinct from the set of BGP routers, and wherein an IP-prefix associated with a remote AS is reachable through each BGP router in the set of BGP routers 206 — Advertise, by using the first controller, an iBGP route for the IP-prefix to each BGP router other than a preferred BGP router, wherein the iBGP route has a local preference value that is greater than local preference values of other eBGP or iBGP routes for the IP-prefix, thereby causing IP traffic destined to the IP-prefix to exit the local AS through the preferred BGP router

(56) References Cited

U.S. PATENT DOCUMENTS

| | | | |
|---|---|---|---|
| 2007/0091796 A1* | 4/2007 | Filsfils | H04L 45/00 370/228 |
| 2012/0144066 A1* | 6/2012 | Medved | H04L 45/02 709/242 |
| 2012/0224506 A1* | 9/2012 | Gredler | H04L 45/04 370/254 |
| 2018/0109444 A1* | 4/2018 | Sajassi | H04L 45/28 370/238 |

* cited by examiner

Process
202

In a local AS, establish an iBGP peering session with each BGP router in a set of BGP routers in the local AS, wherein the iBGP peering session is established by a first controller that is distinct from the set of BGP routers, and wherein an IP-prefix associated with a remote AS is reachable through each BGP router in the set of BGP routers — 204

Advertise, by using the first controller, an iBGP route for the IP-prefix to each BGP router other than a preferred BGP router, wherein the iBGP route has a local preference value that is greater than local preference values of other eBGP or iBGP routes for the IP-prefix, thereby causing IP traffic destined to the IP-prefix to exit the local AS through the preferred BGP router — 206

FIG. 2A

Process
252

In a remote AS, establish an iBGP peering session with each BGP router in a set of BGP routers in the remote AS, wherein the iBGP peering session is established by a second controller — 254

Advertise, by using the second controller, an iBGP route for the IP prefix to only the BGP router in the remote AS that corresponds to the preferred BGP router in the local AS, wherein the iBGP route is more specific than other IGP routes for the IP prefix in the remote AS — 256

Suppress IGP-to-BGP route re-distribution for the IP-prefix on BGP routers other than the BGP router in the remote AS that corresponds to the preferred BGP router in the local AS — 258

FIG. 2B

DYNAMICALLY INFLUENCING ROUTE RE-DISTRIBUTION BETWEEN AN EXTERIOR GATEWAY PROTOCOL AND AN INTERIOR GATEWAY PROTOCOL

RELATED APPLICATION

This application claims benefit of U.S. Provisional Patent Application No. 62/415,344, filed 31 Oct. 2016, the contents of which are herein incorporated by reference in their entirety for all purposes.

BACKGROUND

The present disclosure relates to data communication networks. More specifically, the present disclosure relates to dynamically influencing route re-distribution between an exterior gateway protocol and an interior gateway protocol. Data communication networks include a variety of network devices for sending, receiving, directing, and optimizing network data traffic. According to one definition, a network is an interconnection of one or more devices that is capable of delivering information from one network node to another network node. A network node can generally refer to any device that is capable of sending and/or receiving data over a network. Examples of networks include, but are not limited to, wireless and wired networks, local area networks (LANs), metropolitan area networks (MANs), wide area networks (WANs), private networks, public networks, intranets, the Internet, etc.

An autonomous system (AS) is a collection of network devices under the control of a single administrative entity. Because the network devices in an AS are within the control of a single administrative entity, the administrative entity has knowledge of the network topology and configuration of the network devices. A large network may include multiple ASs that are under the control of different administrative entities. In such scenarios, a given AS may want to control the amount of information that is shared with other ASs. Even when a single large network is controlled by a single administrative entity, the administrative entity may want to partition the large network into multiple ASs to facilitate scalability and network management.

The routing protocol that is used within an AS is called an interior (or internal) gateway protocol (IGP), and the routing protocol that is used to exchange routing and reachability information between AS s is called an exterior (or external) gateway protocol (EGP). Note that, it may be possible to use an EGP within an AS, but such use may not be advisable because EGPs are not designed or optimized for such use. In this disclosure, the term "EGP" refers to a class of protocols that is used to exchange routing and reachability information between ASs. Note that, as used in this disclosure, the term "EGP" does not refer to the specific routing protocol called the "Exterior Gateway Protocol" (which is an obsolete protocol). Each AS is associated with a set of Internet Protocol (IP) prefixes, and an important functionality of an EGP is to distribute routing information across a large network so that routers know how to route packets for a given IP prefix.

At a customer site, different networks may provide connectivity to a particular remote site. Typically, the EGP route advertisements will indicate that the EGP routes from the remote site could arrive on a given network from a set of networks. The network administrators of an AS may desire to steer traffic destined to a particular remote site through a preferred network/border router.

One existing approach to achieve this involves static configuration of the border routers to prefer certain routes from a specific provider network using route filters based on network prefixes, route attributes, etc. Router filters or route maps can be configured on the border routers to: (1) identify the routes to specific prefixes or routes that arrive with certain route attributes, and (2) control the re-distribution of these routes into the IGP using access control lists. Unfortunately, such static configurations are hard to deploy in scaled environments and, once configured, they cannot be changed on-the-fly based on dynamic metrics such as network quality measurements.

Some other approaches to dynamically steering traffic involve replacing the border routers with traffic-steering devices, or requiring that the border routers be one hop away from the traffic-steering devices. Unfortunately, these approaches are impractical because of the cost (e.g., because it can be very costly to replace border routers), and/or because they impose impractical and unnecessary constraints on the network (e.g., by requiring that the border router be one hop away from a device that can help steer the traffic).

Therefore, what are needed are techniques and systems to dynamically steer traffic without the above-described drawbacks.

SUMMARY

Some embodiments described herein provide techniques and systems for dynamically steering traffic by dynamically influencing route re-distribution between an EGP (e.g., Border Gateway Protocol (BGP)) and an IGP (e.g., Open Shortest Path First (OSPF)). Some embodiments can dynamically influence which routes are re-distributed into the IGP network for use in cases where traffic destined to that particular remote site is desired to be steered on the desired network/border router. Similarly, some embodiments can dynamically influence route re-distribution from the IGP network to the EGP network for particular destinations so that traffic entering the local site is attracted over a particular network/border router. In this manner, embodiments described herein provide a dynamic route engineering solution, which can help traffic to and from a particular destination to be steered over a particular network.

In some embodiments, IP traffic can be dynamically steered between a local AS and a remote AS, wherein the local AS includes a first controller and the remote AS includes a second controller.

Specifically, in the local AS, the first controller can establish an internal-BGP (iBGP) peering session with each BGP router in a set of BGP routers in the local AS, wherein the first controller is distinct from the set of BGP routers, and wherein an IP-prefix associated with a remote AS is reachable through each BGP router in the set of BGP routers. Next, for each BGP router other than a preferred BGP router, the first controller can advertise an iBGP route for the IP-prefix, wherein the iBGP route has a local preference value that is greater than local preference values of other eBGP or iBGP routes to the IP-prefix, thereby causing IP traffic destined to the IP-prefix to exit the local AS through the preferred BGP router. In some embodiments, the iBGP route is advertised with a BGP community attribute that instructs BGP routers to not export the iBGP route outside the local AS.

In the remote AS, the second controller can establish an iBGP peering session with each BGP router in a set of BGP routers in the remote AS. The second controller can then advertise an iBGP route for the IP-prefix to only the BGP router in the remote AS that corresponds to the preferred BGP router in the local AS, wherein the iBGP route is more specific than other IGP routes for the IP-prefix in the remote AS. Next, IGP-to-BGP route re-distribution can be suppressed for the IP-prefix on BGP routers other than the BGP router in the remote AS that corresponds to the preferred BGP router in the local AS.

In some embodiments, the preferred BGP router in the local AS can be selected based on a policy rule. In some embodiments, the preferred BGP router in the local AS can be selected based on a dynamic network metric.

In some embodiments, each BGP router in the local AS can be initialized by (1) enabling external-BGP (eBGP) route re-distribution into the interior gateway protocol (IGP), (2) disabling re-distribution of iBGP routes into the IGP, and (3) setting an administrative distance of the IGP to be less than iBGP.

BRIEF DESCRIPTION OF THE FIGURES

FIGS. 2A-2C illustrate how route re-distribution can be dynamically influenced between an EGP and an IGP in accordance with some embodiments described herein.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein. In this disclosure, when the term "and/or" is used with a list of entities, it refers to all possible combinations of the list of entities. For example, the phrase "X, Y, and/or Z" covers the following cases: (1) only X; (2) only Y; (3) only Z; (4) X and Y; (5) X and Z; (6) Y and Z; and (7) X, Y, and Z. Additionally, in this disclosure, the term "based on" means "based solely or partially on."

Figure 1:
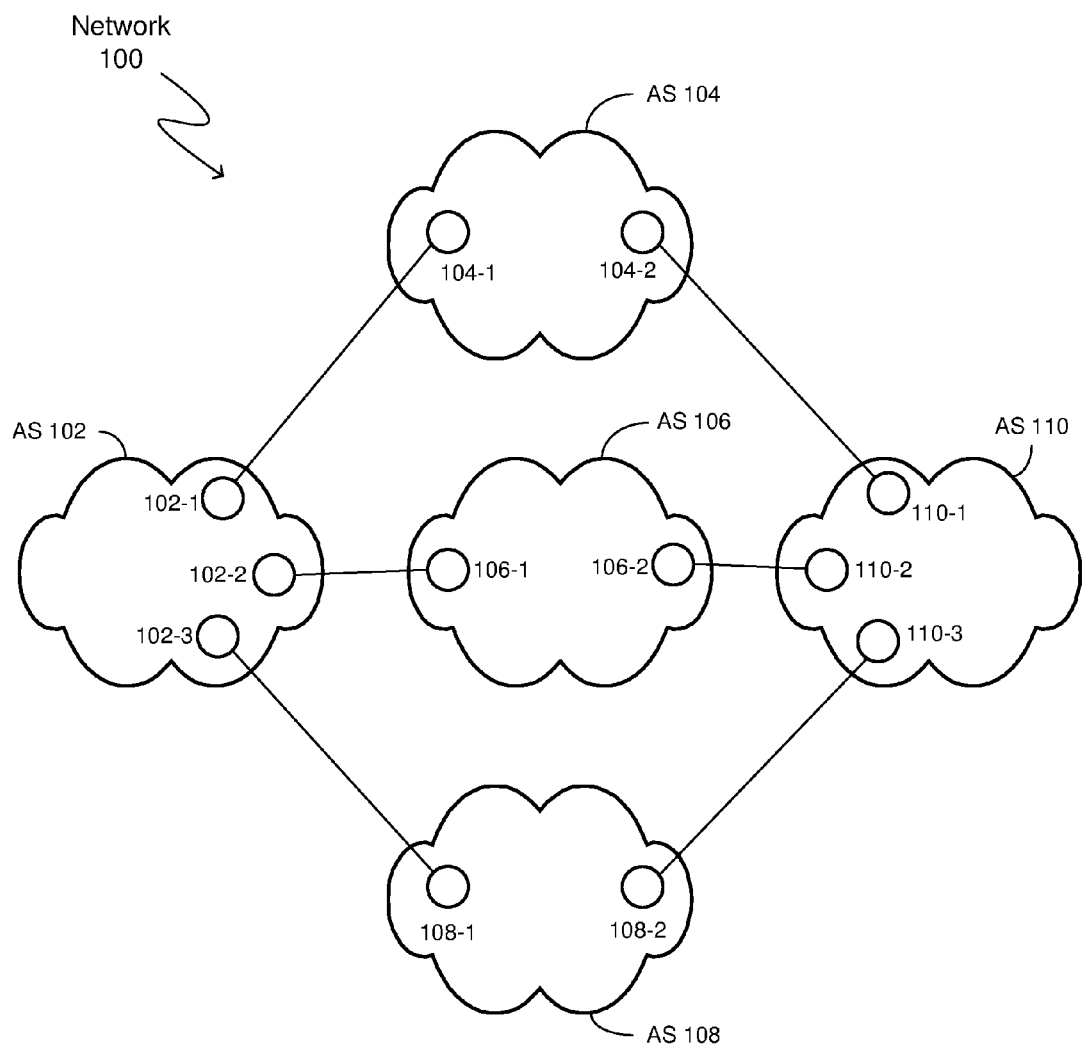
FIG. 1 illustrates a network comprising multiple ASs in accordance with some embodiments described herein.

FIG. 1 illustrates a network comprising multiple ASs in accordance with some embodiments described herein. A large network, such as network 100, is often partitioned into a set of ASs, such as ASs 102, 104, 106, 108, and 110. Each AS can include a network of routers. For example, AS 102 can include routers 102-1, 102-2, and 102-3; AS 104 can include routers 104-1 and 104-2; AS 106 can include routers 106-1 and 106-2; AS 108 can include routers 108-1 and 108-2; and AS 110 can include routers 110-1, 110-2, and 110-3.

Within a given AS, communication between routers can occur through one or more hops. For example, router 102-1 may be directly connected with router 102-2 (e.g., a fiber optic cable may connect a port on router 102-1 with a port on router 102-2), or router 102-1 may be indirectly connected with router 102-2 (i.e., through one or more intermediate routers within AS 102).

All of the routers shown in FIG. 1 are connected to routers that belong to other ASs. The connections within the AS have not been shown in FIG. 1. For example, router 102-1 will have other connections with routers within AS 102, but these connections have not been shown in FIG. 1. Typically, most routers in an AS are not connected to routers that belong to other ASs.

As mentioned above, the routing protocol that is used within an AS is called an IGP, and the routing protocol that is used to exchange routing and reachability information between ASs is called an EGP. For example, routers within an AS (e.g., routers 102-1, 102-2, 102-3, and other routers not shown within AS 102) may exchange routing information among themselves by using an IGP, such as Open Shortest Path First (OSPF). Border or edge routers in an AS that are connected to other border or edge routers belonging to other ASs execute an EGP in addition to executing an IGP. For example, routers 102-1, 102-2, and 102-3 in AS 102 may execute both an IGP and an EGP. On a given border router, the EGP instance exchanges routing and reachability information with the IGP instance. For example, the EGP instance executing on router 102-2 will exchange routing and reachability information with the IGP instance executing on router 102-2.

Border Gateway Protocol (BGP) is a standardized EGP that is designed to exchange routing and reachability information among ASs on the Internet. A BGP peering relationship between a first instance on a first router and a second instance on a second router is established by manual configuration between routers to create a TCP session on port 179. Once such a peering relationship has been established, these two BGP instances are called BGP neighbors, or BGP peers. A BGP instance periodically sends keep-alive messages to each of its peers to maintain the BGP session.

BGP peering relationships can be established between two routers within the same AS, or between two routers in two different ASs. When a BGP connection is established between two BGP peers in the same AS, the connection is referred to as an Internal BGP (iBGP or Interior Border Gateway Protocol) connection. When a BGP connection is established between BGP peers in different ASs, the connection is called an External BGP (eBGP or Exterior Border Gateway Protocol) connection. Typically, eBGP peers are directly connected to each other (e.g., router 102-1 is directly connected to router 104-1), while iBGP peers can be interconnected through other intermediate routers (e.g., router 102-1 can be indirectly connected to router 102-2 through other intermediate routers that have not been shown in FIG. 1). The main difference between iBGP and eBGP peering is in the way routes that were received from one peer are distributed to the other peers. Specifically, new routes learned from an eBGP peer are typically redistributed to all iBGP peers as well as all other eBGP peers (if transit mode is enabled on the router). On the other hand, if new routes are learned on an iBGP peering connection, then they are re-advertised only to all eBGP peers.

Some embodiments described herein dynamically influence which EGP routes (i.e., eBGP) routes are re-distributed by a border router (e.g., a border router that is executing BGP) into the IGP (e.g., OSPF) as well as to dynamically influence which IGP routes are re-distributed into the EGP network. This can be achieved by using a controller which is distinct from the IGP and EGP instances that are executing on the routers.

Dynamically Influencing Route Re-distribution Between an EGP and an IGP

Figure 2C:
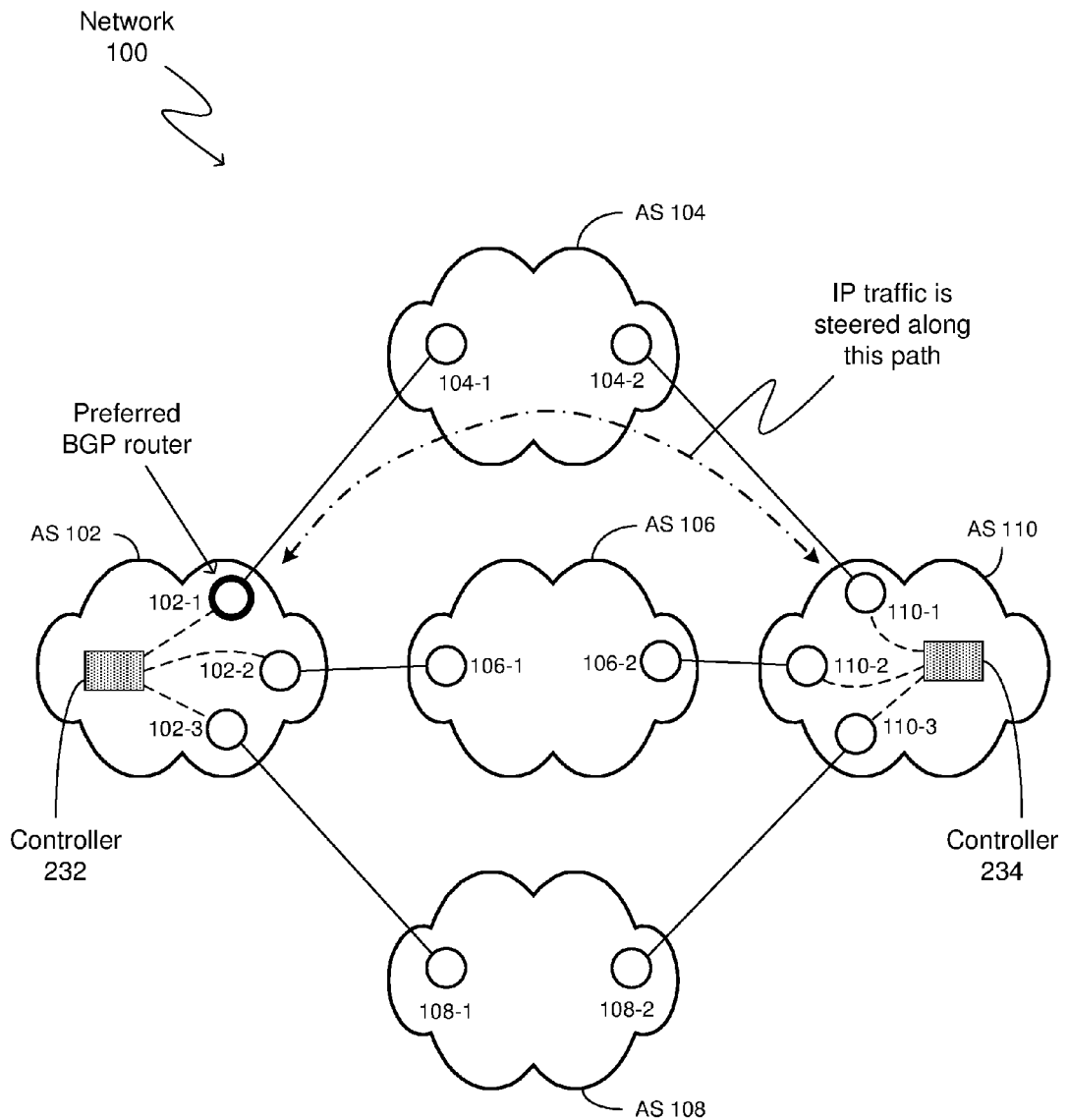

FIGS. 2A-2C illustrate how route re-distribution can be dynamically influenced between an EGP and an IGP in accordance with some embodiments described herein.

Process 202 shown in FIG. 2A can be performed by controller 232 shown in FIG. 2C, and process 252 shown in FIG. 2B can be performed by controller 234 shown in FIG. 2C. As shown in FIG. 2C, controller 232 can be located in AS 102, and controller 234 can be located in AS 110. Note that controller 232 is distinct from routers 102-1, 102-2, and 102-3. Likewise, controller 234 is distinct from routers 110-1, 110-2, and 110-3. In some embodiments, a controller can be a software application executing on a computer. A computer can generally be any device that is capable of performing computations, e.g., a computer can include a processing mechanism that is capable of executing instructions stored on a storage medium. Examples of computers include, but are not limited to, routers, network appliances, network management servers, desktop computers, etc.

As shown in FIG. 2C, multiple paths exist between AS 102 and AS 110. Specifically, AS 110 is reachable through ASs 104, 106, and 108. Without loss of generality, let us assume that it is desired to steer IP traffic between AS 102 and AS 110 so that the IP traffic passes through AS 104, but does not pass through AS 106 or AS 108 (e.g., ASs 104, 106, and 108 may correspond to different types of networks or may belong to different network providers, and it may be desirable to route traffic associated with a given IP-prefix via AS 104 only). The processes illustrated in FIGS. 2A and 2B can be used to achieve such IP traffic steering.

Specifically, as shown in FIG. 2A, process 202 can begin by establishing an iBGP peering session with each BGP router in a set of BGP routers (e.g., routers 102-1, 102-2, and 102-3) in the local AS (e.g., AS 102), wherein the iBGP peering session is established by a first controller (e.g., controller 232) that is distinct from the set of BGP routers, and wherein an IP-prefix associated with a remote AS (e.g., AS 110) is reachable through each BGP router in the set of BGP routers (step 204). The iBGP peering sessions between controller 232 and routers 102-1, 102-2, and 102-3 are shown in FIG. 2C using dashed lines.

Next, the process can advertise, by using the first controller (e.g., controller 232), an iBGP route for the IP-prefix to each BGP router other than a preferred BGP router, wherein the iBGP route has a local preference value that is greater than local preference values of other eBGP or iBGP routes for the IP-prefix, thereby causing IP traffic destined to the IP-prefix to exit the local AS through the preferred BGP router (step 206). For example, if the preferred BGP router is router 102-1, then controller 232 can advertise the iBGP route to routers 102-2 and 102-3. Note that this iBGP route for the IP-prefix is not advertised to router 102-1, so only router 102-1 re-distributes its route to the other routers in AS 102 (i.e., via a BGP-to-IGP route re-distribution), and in doing so, causes all IP traffic in AS 102 that is destined to the IP-prefix in AS 110 to be steered through router 102-1.

Process 252 shown in FIG. 2B can begin by establishing an iBGP peering session with each BGP router in a set of BGP routers in the remote AS, wherein the iBGP peering session is established by a second controller, e.g., controller 234 (step 254). Next, the process can advertise, by using the second controller, an iBGP route for the IP-prefix to only the BGP router (e.g., router 110-1) in the remote AS (e.g., AS 110) that corresponds to the preferred BGP router (e.g., router 102-1) in the local AS (e.g., AS 102), wherein the iBGP route is more specific than other IGP routes for the IP prefix in the remote AS (step 256). Specifically, BGP routers 102-1 and 110-1 correspond to each other because traffic between AS 102 and AS 110 that exits BGP router 102-1 enters BGP router 110-1, and vice versa. Likewise, BGP routers 102-2 and 110-2 correspond to each other, and BGP routers 102-3 and 110-3 correspond to each other.

The process can then suppress IGP-to-BGP route re-distribution for the IP-prefix on BGP routers other than the BGP router in the remote AS that corresponds to the preferred BGP router in the local AS (step 258). For example, if the preferred BGP router is router 102-1 in AS 102, which corresponds to router 110-1 in AS 110, then the IGP-to-BGP route re-distribution for the IP-prefix can be suppressed on BGP routers 110-2 and 110-3. In this manner, all traffic for the IP-prefix that flows from AS 110 to AS 102 will enter through router 102-1, which is the preferred BGP router in AS 102. If the IGP is OSPF, then IGP-to-BGP route re-distribution for the IP-prefix can be suppressed by advertising all the concerned routes as OSPF external "LSA 5" routes with the completeness bit in the route tag set to zero. This instructs the border router receiving the OSPF route to not re-distribute this route into the BGP network.

Figure 3:
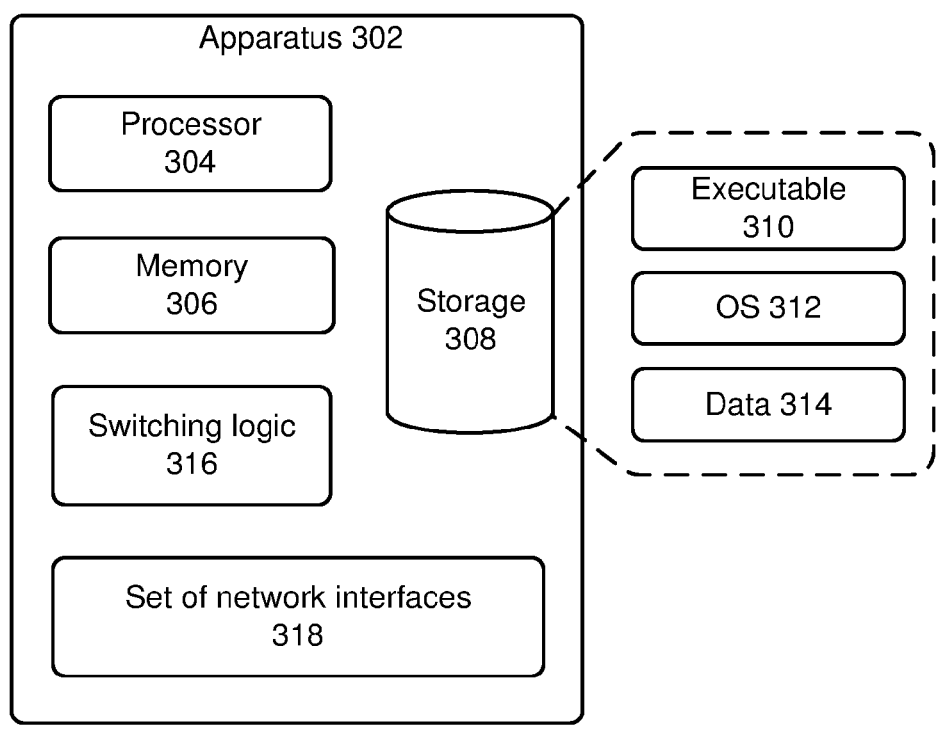
FIG. 3 illustrates an apparatus in accordance with some embodiments described herein.

FIG. 3 illustrates an apparatus in accordance with some embodiments described herein. Apparatus 302 (which can be an implementation for a controller) comprises processor 304, memory 306 (e.g., a volatile or non-volatile random access memory), and storage 308 (e.g., a flash memory device or a disk drive). Storage 308 can store executable 310, operating system 312, and data 314. Apparatus 302 also includes switching logic 316 and set of network interfaces 318. The components in apparatus 302 can communicate with one another using a communication mechanism, e.g., a bus, a backplane, and/or a switching fabric.

Executable 310 can include instructions that, when executed by processor 304, cause apparatus 302 to perform one or more methods that are implicitly or explicitly described in this disclosure. Data 314 can include any data that is inputted into or outputted by executable 310. Set of network interfaces 318 can be used to transmit data to and/or receive data from other communication devices. Switching logic 316 can forward network traffic received on one or more network interfaces in accordance with switching/forwarding/routing information stored in apparatus 302. The block diagrams of the architecture and flow charts are grouped for ease of understanding. However it should be understood that combinations of blocks, additions of new blocks, re-arrangement of blocks, and the like are contemplated in alternative embodiments of the present invention.

Further embodiments can be envisioned by one of ordinary skill in the art. Combinations or sub-combinations of the subject matter disclosed herein can be advantageously made. This disclosure presented some embodiments of how IP traffic can be steered through a preferred BGP router. Two components were disclosed, namely an "Exit" strategy and an "Entry" strategy, wherein the "Exit" and "Entry" refer to the direction of network traffic from/to a site. The "Exit" strategy can be implemented by influencing which EGP border router re-distributes routes into the IGP for a particular destination; outgoing traffic exiting the site to the destination could be steered on to a particular network. On the other hand, the "Entry" strategy can be implemented by influencing through which EGP border router the best route to an internal destination is advertised; incoming traffic to the site could be attracted through a particular network.

More specifically, the aim of the "Exit" strategy is to choose one border router to unambiguously provide the best route for a given remote site; hence, all traffic from the local site to the remote site "exits" via the chosen border router. For a given remote site, a border router is chosen as the exit point and the rest of the border routers are grouped as non-preferred ones. In such a setup the solution strives to dynamically influence the non-preferred border routers to suppress re-distributing their EGP routes to the remote site into the IGP. Hence, only the preferred router re-distributes its EGP route into the IGP, thus becoming the unambiguous exit point for this remote site. In the implementation examples discussed above, the EGP was the eBGP, and the IGP could be any IGP protocol like OSPF, EIGRP, RIP. However, the iBGP cannot be used as the IGP in these implementation examples. The iBGP was instead used as the channel to influence the border routers. In some embodiments, the controller application can be executing on a network appliance, provided that the network appliance is also executing an IGP (e.g., OSPF) and an EGP (e.g., BGP) routing stack.

A one-time configuration can be performed on the BGP routers as follows: (1) enable iBGP peering with the appliance running the controller application, (2) enable eBGP route re-distribution into the IGP, (3) disable re-distribution of iBGP routes into the IGP (this is the default configuration on most routers), and (4) check/set the administrative distance of the IGP (say OSPF) to be less than iBGP (this is the default configuration with respect to OSPF and iBGP on most routers). Once the initial configuration has been performed, the controller application can then auto-learn the AS in the customer site and creates a BGP instance using the same AS. Next, the controller can establish iBGP peering sessions with all the border routers at the local site. For a given destination to which eBGP routes may be received at multiple border routers, the controller application determines which border router it would prefer the route from, based on either user policy or dynamic network metrics. Based on the above choice, the controller application identifies the set of non-preferred border routers on which the re-distribution of this route needs to be suppressed. Next, over each of the iBGP sessions with non-preferred border routers: (1) the controller application advertises a fake higher local preference iBGP route for the same network prefixes identified by the chosen route to the non-preferred border router, and (2) the receiving border router now selects this iBGP route as the best route.

Given the configuration to not re-distribute an iBGP route, this border router does not redistribute any route to these prefixes into the IGP. This fake iBGP route is advertised with a BGP community attribute "no export" set to true so that this fake route is not advertised again to the external world. This avoids any potential routing loops. In this manner, only the preferred border router would re-distribute its eBGP route into the IGP network and all internal routers will choose it as the next-hop for traffic exiting the site.

The aim for the entry strategy is to only advertise routes to a site local endpoint via a particular chosen border router; hence, all traffic destined to the local endpoint "enters" the site via the particular chosen border router. During operation, the controller application at the remote site can advertise a more specific iBGP route than the IGP route, to only the preferred border router. By virtue of it being the more specific route, it wins over any IGP route on the border router, thus masking the IGP to EGP route distribution on that border router. Instead the iBGP route in itself is sent as the eBGP route to the external world. However, this does not stop IGP to EGP route re-distribution at other border routers. Thus, we need the second part of the solution where it is ensured that the IGP route is not re-distributed over the EGP network. This can be achieved by either using static configuration or enabling protocol-specific features to make an IGP route a non-candidate for IGP to EGP re-distribution. One such technique that works for OSPF is to advertise all the concerned routes as OSPF external "LSA 5" routes with the completeness bit in the route tag set to zero. This instructs the border router receiving the OSPF route to not re-distribute this route into the BGP network.

Embodiments described herein enable dynamic routing decisions to be influenced without repeated network administrator interventions or configurations on the border routers. Additionally, there are no restrictions on the placement of the controller application, as all that is needed is an iBGP session to the border routers. Specifically, the embodiments allow the controller application to react to changes in network metrics and accordingly influence preferred routers to become entry or exit points for traffic to/from given destination prefixes. In some scenarios, the embodiments disclosed herein can be used with overlay networks to solve a plurality of use-cases such as dynamic user traffic steering based on policy.

The methods and processes described in this disclosure can be partially or fully embodied as code and/or data stored in a non-transitory computer-readable storage medium or device, so that when a computer system reads and executes the code and/or data, the computer system performs the associated methods and processes. The methods and processes can also be partially or fully embodied in hardware modules or apparatuses. Note that the methods and processes can be embodied using a combination of code, data, and hardware modules or apparatuses.

The data structures and code described in this disclosure can be partially or fully stored on a non-transitory computer-readable storage medium and/or a hardware module and/or hardware apparatus. A non-transitory computer-readable storage medium includes all computer-readable storage mediums with the sole exception of a propagating electromagnetic wave or signal. Specifically, a non-transitory computer-readable storage medium includes, but is not limited to, volatile memory, non-volatile memory, magnetic and optical storage devices such as disk drives, magnetic tape, CDs (compact discs), DVDs (digital versatile discs or digital video discs), or other media, now known or later developed, that are capable of storing code and/or data. Hardware modules or apparatuses described in this disclosure include, but are not limited to, application-specific integrated circuits (ASICs), field-programmable gate arrays (FPGAs), dedicated or shared processors, and/or other hardware modules or apparatuses now known or later developed.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for dynamically steering Internet Protocol (IP) traffic between a local Autonomous System (AS) and a remote AS, wherein the local AS includes a first controller and the remote AS includes a second controller, the method comprising:
   in the local AS, the first controller establishing an internal Border Gateway Protocol (iBGP) peering session with each Border Gateway Protocol (BGP) router in a first set of BGP routers in the local AS, wherein the first controller is distinct from the first set of BGP routers, and wherein an IP-prefix associated with the remote AS is reachable through each BGP router in the first set of BGP routers; and in the local AS, for each BGP router other than a preferred local BGP router in the first set of BGP routers, the first controller advertising an iBGP route for the IP-prefix, wherein the iBGP route has a local preference value that is greater than local preference values of other external Border Gateway Protocol (eBGP) or iBGP routes to the IP-prefix, thereby causing IP traffic destined to the IP-prefix to exit the local AS through the preferred local BGP router.

2. The method of claim 1, comprising selecting the preferred local BGP router based on a policy rule.

3. The method of claim 1, comprising selecting the preferred local BGP router based on a dynamic network metric.

4. The method of claim 1, comprising initializing each BGP router by (1) enabling eBGP route re-distribution into an Interior Gateway Protocol (IGP), (2) disabling re-distribution of iBGP routes into the IGP, and (3) setting an administrative distance of the IGP to be less than iBGP.

5. The method of claim 1, wherein the iBGP route is advertised with a BGP community attribute that instructs BGP routers to not export the iBGP route outside the local AS.

6. The method of claim 1, comprising:
in the remote AS, the second controller establishing an iBGP peering session with each BGP router in a second set of BGP routers in the remote AS;
the second controller advertising an iBGP route for the IP-prefix to only a preferred remote BGP router in the remote AS that corresponds to the preferred local BGP router in the local AS, wherein the iBGP route is more specific than other Interior Gateway Protocol (IGP) routes for the IP-prefix in the remote AS; and
suppressing IGP-to-BGP route re-distribution for the IP-prefix on BGP routers other than the preferred remote BGP router in the remote AS.

7. A non-transitory computer-readable storage medium storing instructions that, when executed by a processor in a network node belonging to a local Autonomous System (AS), cause the network node to perform a method for dynamically steering Internet Protocol (IP) traffic between the local AS and a remote AS, the method comprising:
establishing an internal Border Gateway Protocol (iBGP) peering session with each Border Gateway Protocol (BGP) router in a first set of BGP routers in the local AS, wherein the network node is distinct from the first set of BGP routers, and wherein an IP-prefix associated with the remote AS is reachable through each BGP router in the first set of BGP routers; and
for each BGP router other than a preferred local BGP router in the first set of BGP routers, advertising an iBGP route for the IP-prefix, wherein the iBGP route has a local preference value that is greater than local preference values of other external Border Gateway Protocol (eBGP) or iBGP routes to the IP-prefix, thereby causing IP traffic destined to the IP-prefix to exit the local AS through the preferred local BGP router.

8. The non-transitory computer-readable storage medium of claim 7, wherein the method comprises selecting the preferred local BGP router based on a policy rule.

9. The non-transitory computer-readable storage medium of claim 7, wherein the method comprises selecting the preferred local BGP router based on a dynamic network metric.

10. The non-transitory computer-readable storage medium of claim 7, wherein the method comprises initializing each BGP router by (1) enabling (eBGP) route re-distribution into an Interior Gateway Protocol (IGP), (2) disabling re-distribution of iBGP routes into the IGP, and (3) setting an administrative distance of the IGP to be less than iBGP.

11. The non-transitory computer-readable storage medium of claim 7, wherein the iBGP route is advertised with a BGP community attribute that instructs BGP routers to not export the iBGP route outside the local AS.

12. A method for dynamically steering Internet Protocol (IP) traffic between a local Autonomous System (AS) and a remote AS, wherein the local AS includes a first controller and a first set of Border Gateway Protocol (BGP) routers, and wherein the remote AS includes a second controller and a second set of BGP routers, the method comprising:
in the remote AS, the second controller establishing an internal Border Gateway Protocol (iBGP) peering session with each BGP router in the second set of BGP routers in the remote AS;
in the remote AS, the second controller advertising an iBGP route for an IP-prefix to only a preferred remote BGP router in the remote AS that corresponds to a preferred local BGP router in the local AS, wherein the iBGP route is more specific than other Interior Gateway Protocol (IGP) routes for the IP-prefix in the remote AS; and
in the remote AS, suppressing IGP-to-BGP route re-distribution for the IP-prefix on BGP routers other than the preferred remote BGP router in the remote AS.

13. The method of claim 12, comprising:
in the local AS, the first controller establishing an internal-BGP (iBGP) peering session with each BGP router in the first set of BGP routers in the local AS, wherein the first controller is distinct from the first set of BGP routers, and wherein the IP-prefix associated with the remote AS is reachable through each BGP router in the first set of BGP routers; and
for each BGP router in the first set of BGP routers other than the preferred local BGP router, the first controller advertising an iBGP route for the IP-prefix, wherein the iBGP route has a local preference value that is greater than local preference values of other external Border Gateway Protocol (eBGP) or iBGP routes to the IP-prefix, thereby causing IP traffic destined to the IP-prefix to exit the local AS through the preferred local BGP router.

14. The method of claim 13, comprising selecting the preferred local BGP router based on a policy rule.

15. The method of claim 13, comprising selecting the preferred local BGP router based on a dynamic network metric.

16. The method of claim 13, comprising initializing each BGP router by (1) enabling eBGP route re-distribution into an Interior Gateway Protocol (IGP), (2) disabling re-distribution of iBGP routes into the IGP, and (3) setting an administrative distance of the IGP to be less than iBGP.

17. The method of claim 13, wherein the iBGP route is advertised with a BGP community attribute that instructs BGP routers to not export the iBGP route outside the local AS.

* * * * *